United States Patent
Hauth

[15] 3,692,148
[45] Sept. 19, 1972

[54] DISC BRAKE AND SUPPORT MEANS THEREFOR

[72] Inventor: Jean-Marc Hauth, Pont-A-Mousson, France

[73] Assignee: Societe Des Fonderies De Pont-A-Mousson, Nancy, France

[22] Filed: June 4, 1971

[21] Appl. No.: 150,094

[30] Foreign Application Priority Data

June 16, 1970 France..................7022037

[52] U.S. Cl..............188/18 A, 188/71.1, 188/73.5, 192/70.2
[51] Int. Cl.................................................B60t 1/06
[58] Field of Search.........188/71.1, 73.5, 18 A, 73.3; 192/70.19, 70.2

[56] References Cited

UNITED STATES PATENTS 3,630,320 12/1971 Lochmann............188/73.5 X
3,642,101 2/1972 Harth....................188/73.5 X Primary Examiner—George E. A. Halvosa
Attorney—J. Delattre-Seguy

[57] ABSTRACT

Disc brake having a floating disc driven in rotation by a drum through keying means. The keying means comprise projections on the disc which extend into recesses in the drum. A spring strip resiliently engages an outer peripheral face of each projection and is secured to the drum at each end of the strip by means which allow freedom of movement of the strip axially and circumferentially of the drum and maintain the strip in engagement with the peripheral face and substantially parallel to a plane perpendicular to the axis of rotation of the drum.

8 Claims, 7 Drawing Figures

PATENTED SEP 19 1972

INVENTOR:
Jean-marc HAUTH
by: J. Delattre-Seguy
Attorney

DISC BRAKE AND SUPPORT MEANS THEREFOR

The present invention relates to disc brakes of the type having a floating disc and a fixed inner caliper adapted to brake heavy road vehicles, such as trucks or buses.

In known brakes of this type the floating disc is keyed, by projections and associated cavities, to a drum which is connected to rotate with the wheel to be braked. This disc is gripped between brake pads to be braked. This disc is gripped between brake pads of a fixed caliper which carries the friction elements of which one is fixed and the other movable and actuated by a piston and cylinder fluid motor or by a mechanical device.

In one of these known brakes, the disc has keying projections and the drum has co-operating recesses adapted to maintain the drum and disc stationary with respect to each other as concerns rotation. At least one spring strip is secured to the drum in the region of each disc projection and positioned to bear resiliently against the projection.

An object of the invention is to provide a disc brake of the aforementioned type comprising a fixed caliper carrying a fixed friction element and a movable friction element, a floating disc connected by keying means including projections and recesses to a drum so as to be rotated by the drum which is secured to the wheel to be braked, and at least one spring strip secured to the drum in the region of each projection, wherein the spring strips are connected to the drum in an improved manner.

In the brake according to the invention, each spring strip is secured at each of its ends to the drum by at least one device which is arranged to allow the strip freedom of movement circumferentially and axially of the drum while it always maintains the strip substantially parallel to the outer face of the drum and in bearing relation to the outer peripheral face of the corresponding projection of the disc.

With this arrangement, the spring strips bearing against the disc projections can move with the latter owing to the circumferential and axial freedom of movement so that the movement of the disc away from the fixed friction element after braking can occur easily, whereas in known devices the frictional forces between the disc and the spring strips, which are held in position with no possibility of movement with respect to the drum, must be overcome to allow movement of the disc away from the fixed friction element and avoid a continuous wear of the fixed friction element against which the disc is forced when braking.

Further features and advantages of the invention will be apparent from the ensuing description with reference to the accompanying drawings.

Figure 1:
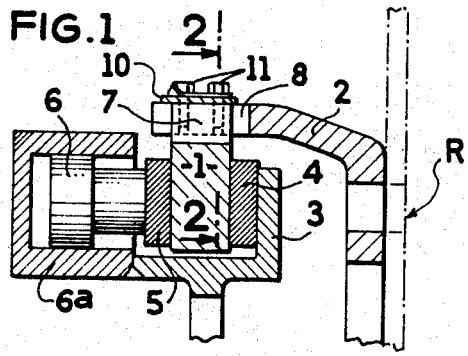
FIG. 1 is a partial sectional view in an axial and radial plane of a brake according to the invention.
Figure 2:
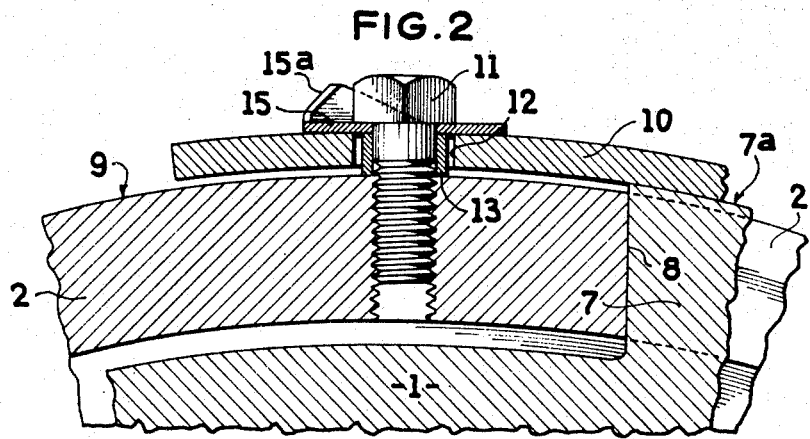
FIG. 2 is a partial sectional view taken along line 2—2 of FIG. 1, on an enlarged scale, of the device interconnecting the disc and drum.
Figure 3:
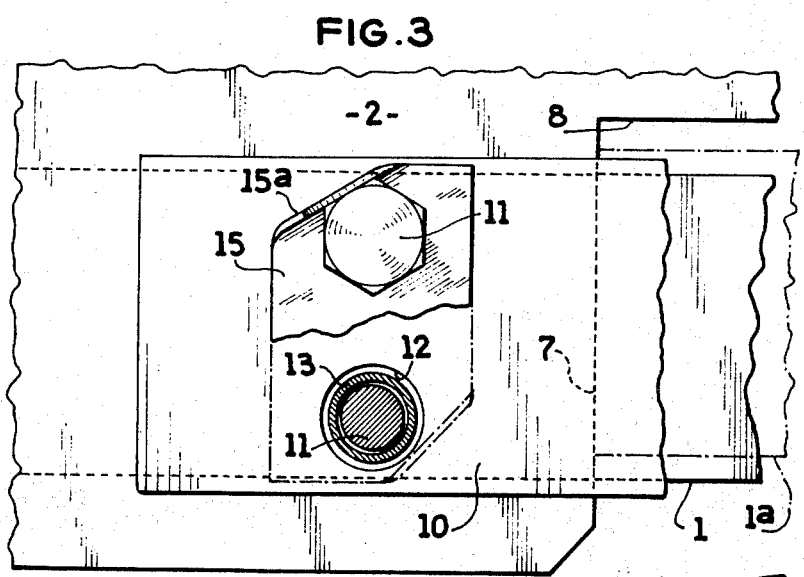
FIG. 3 is a plan view of the device with parts cut away.

In the embodiment shown in FIGS. 1-3, the invention is shown to be applied to a disc brake having a disc 1 driven in rotation by a drum 2 adapted to be secured to the side of the wheel R to be braked and a fixed inner caliper 3 provided with a fixed friction element 4 and a movable friction element 5. The latter can be shifted by the piston 6 of a fluid motor having a cylinder 6a which constitutes an attached branch of the caliper.

The invention resides in particular in the keying of the disc 1 to the drum 2 by the combination of projections 7 on the disc engaged in recesses 8 in the drum. The projections 7 have an outside diameter exceeding the outside diameter of the drum os that these projections extend radially beyond the outer face 9 of the drum. A spring strip 10, which is plane in an unstressed condition, is secured to the drum in a position adjacent each projection and recess, which it spans, by means of screws 11. There are two screws at each end of the strip. Each screw 11 passes through the strip 10 which is provided with an aperture 12 for this purpose and then extends axially through a spacer tube 13 having an outside diameter less than the diameter of the aperture 12 in the strip. This spacer tube is moreover of a length exceeding the thickness of the strip. The screws 11 are screwthreadedly engaged in tapped holes 14 in the drum located on each side of the recess 8. For each pair of screws 11 there is provided a plate 15 having raised corners 15a which serve to lock the screws against rotation. The screws extend through the plate and the plate is interposed between the spring strip and the screw heads.

The assembly is carried out in the following manner:

The projections 7 of the disc 11 are inserted in the recesses 8 in the drum 2, the spring strip 10, which is initially plane, is first secured at one end to the drum by means of the corresponding screws 11 by interposing between the drum and the screw heads the spacer tubes 13 which are located in the apertures 12 in the strip. The other end of the latter is secured in the same manner. This causes the strip to bend and to become applied against the outer end face of the projection 7.

Owing to the fact that the spacer tubes 13 have a length exceeding the thickness of the strip 10 the latter bears against the outer peripheral face 7a of the projection 7 of the disc 1 but does not bear against the drum 2 on each side of the recess 8. Further, the apertures 12 of the strip have a diameter exceeding the outside diameter of the spacer tubes 13 and the strip 10 is free to move circumferentially and axially with respect to the drum.

Owing to the fact that the spring strips are secured to the drum 2 with axial and circumferential play, when the braking ceases and the piston 6 moves rearwardly and carries therewith the movable friction element 5, the disc 1 is free to easily separate from the fixed friction element 4 by shifting the strips 10 therewith. Indeed, the strips are slidable with the disc 1 under the screw-locking plates 15 since the frictional forces between each strip and the plates 15 are much smaller than the frictional forces between the projections 7 of the disc 1 and the spring strips 10. Thus, there is no longer any wear on the fixed friction element 4 and no heating of the disc outside the braking periods.

The fact of placing two screws at each end of the strip 10 in the same radial axial plane of the drum ensures that the strip does not become askew when the disc 1 is not exactly centered on the strip, bearing in mind that the disc can assume different positions according as the fruction elements are more or less worn (FIG. 3 shows two positions of the disc, namely in full line at 1 and in dot-dash line at 1a).

Figure 5:
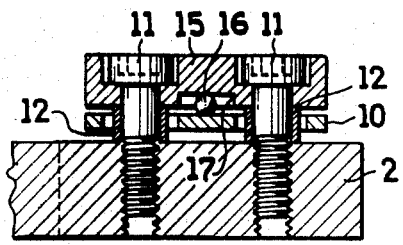
FIG. 5 is a sectional view taken along line 5—5 of FIG. 4.
Figure 4:
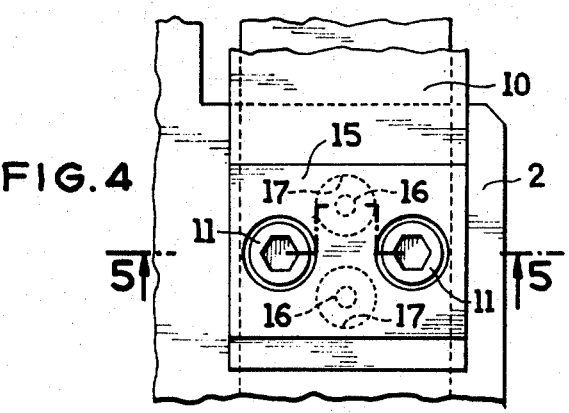
FIG. 4 is a partial front elevational view of a first modification of the invention.
Figure 7:
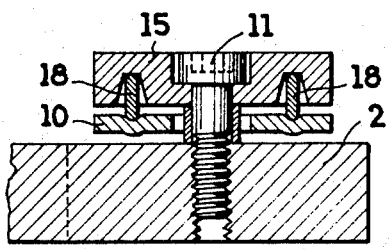
FIGS. 6 and 7 are views of another modification of the invention, FIG. 7 being a sectional view taken along line 7—7 of FIG. 6.
Figure 6:
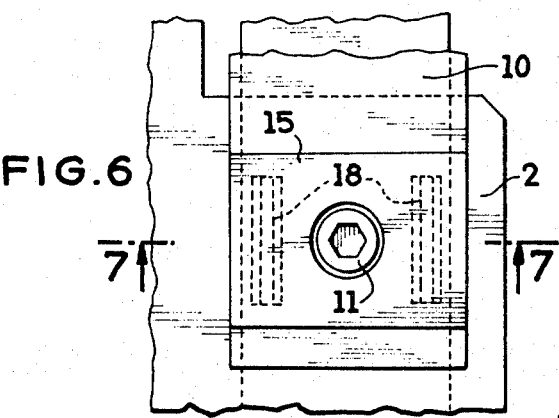

FIGS. 4-7 show modifications of the invention which facilitate the axial displacement of the spring strips and consequently the movement of the disc away from the fixed friction element when braking ceases, by decreasing the friction between the spring strips and the screw-locking plates 15. This is achieved by interposing between each strip 10 and the plate 15:

a. At least one ball 16 (or roller) in a cavity 17 in the plate 15, (FIGS. 4 and 5). The dimensions of the ball or balls and of the cavity or cavities are such that, under the effect of the disc 1 the spring strip 10 bears against the ball or balls without bearing against the plate 15;

b. One or more spacer members 18 disposed in grooves in the plate 15 (FIGS. 6 and 7) in such manner that they can pivot in these grooves and thus allow the axial displacement of the spring strips 10.

Note that in the modification (b) it is possible to employ only a single screw 11 since the spring strip 10 is maintained parallel to the disc 1 irrespective of the position of the latter by the spacer members 18 disposed between the strip and the plate 15.

Another modification of the invention may reside in the fact of using a disc whose projections have a diameter less than the diameter of the drum. In this case, each spring strip must not be plane in the unstressed state but so shaped that, when placed in position, it abuts the peripheral face of the corresponding projection but does not touch the drum.

Another modification may reside in the replacement of the single spring strips by a plurality of superimposed spring strips which are independent from each other or not.

Having now described my invention what I claim and desire to secure by Letters Patent is:

1. Disc brake for a wheel, comprising a fixed caliper structure carrying a fixed friction element and a movable friction element, a floating disc, a drum for securing to the wheel to rotate with the wheel about an axis of rotation, keying means keying the drum to the disc so that the disc is rotatable by the drum, the keying means comprising recesses in the drum and projections on the disc, each projection extending into and coacting with one of said recesses and having an outer peripheral face, a spring strip resiliently engaging the outer peripheral face of each projection and having two end portions, a securing member fixed in the drum and extending through an aperture in each end portion of each strip with play whereby the strip is free to move axially and circumferentially of the drum to a limited extent, and an enlarged head portion on each securing member for retaining the strip with clearance radially of said axis and maintaining the strip in bearing relation to said outer peripheral face of the corresponding projection.

2. Disc brake for a wheel, comprising a fixed caliper structure carrying a fixed friction element and a movable friction element, a floating disc, a drum for securing to the wheel to rotate with the wheel about an axis of rotation, keying means keying the drum to the disc so that the disc is rotatable by the drum, the keying means comprising recesses in the drum and projections on the disc, each projection extending into and coacting with one of said recesses and having an outer peripheral face, a spring strip resiliently engaging the outer peripheral face of each projection and having two end portions, securing means securing each of said end portions of each strip to the drum, the securing means allowing each strip freedom of movement circumferentially and axially of the drum while maintaining the strip substantially parallel to an outer face of the drum and in bearing relation to said outer peripheral face of the corresponding projection.

3. A brake as claimed in claim 2, wherein said securing means comprise for each end portion of each strip: two apertures contained in a radial plane of the drum in the strip, a spacer tube extending through each aperture with radial clearance, two screws having heads and extending through the spacer tubes and screwthreadedly engaged in the drum, a plate engaging the heads of the screws for locking the heads of the screws, the plate being interposed between the screw heads and the tubes and the tubes having a length exceeding the thickness of the strip.

4. A brake as claimed in claim 2, wherein said securing means comprise for each strip end portion: an aperture in the strip, a spacer tube extending through the aperture with clearance and having a length exceeding the thickness of the strip, a screw having an enlarged head extending through the spacer tube and screwthreadedly engaged in the drum, a plate interposed between the tube and the screw head, the screw extending through an aperture in the plate, and spacer members interposed between and engaging the plate and the strip and arranged to be pivotable with respect to the plate and strip.

5. A brake as claimed in claim 4, wherein said spacer members are elongate circumferentially of the drum and contained in planes perpendicular to said axis.

6. A brake as claimed in claim 1, wherein said securing means comprise for each strip end portion: an aperture in the strip, a spacer tube extending through the aperture with clearance and having a length exceeding the thickness of the strip, a screw having an enlarged head extending through the spacer tube and screwthreadedly engaged in the drum, a plate interposed between the tube and the screw head, the screw extending through an aperture in the plate and a rolling member interposed between and rollingly engaging the plate and the spring strip.

7. A brake as claimed in claim 6, wherein the rolling member is a ball.

8. A brake as claimed in claim 6, comprising two of said screws for each strip end portion.

* * * * *